(12) United States Patent
Asada

(10) Patent No.: US 7,715,860 B2
(45) Date of Patent: May 11, 2010

(54) MOBILE PHONE AND METHOD OF CONTROLLING TRANSMISSION POWER

(75) Inventor: Kenichi Asada, Tokyo (JP)

(73) Assignee: NEC Corporation, Tokyo (JP)

( * ) Notice: Subject to any disclaimer, the term of this patent is extended or adjusted under 35 U.S.C. 154(b) by 870 days.

(21) Appl. No.: 10/911,607

(22) Filed: Aug. 5, 2004

(65) Prior Publication Data

US 2005/0043054 A1 Feb. 24, 2005

(30) Foreign Application Priority Data

Aug. 18, 2003 (JP) ............................. 2003-294652

(51) Int. Cl.
*H04M 1/00* (2006.01)
(52) U.S. Cl. ........................ 455/522; 455/69; 455/70; 370/318
(58) Field of Classification Search ................. 455/522, 455/69–70, 442, 443, 437; 370/318, 342, 370/320
See application file for complete search history.

(56) References Cited

U.S. PATENT DOCUMENTS

| | | | | |
|---|---|---|---|---|
| 6,185,431 | B1 * | 2/2001 | Li et al. ...................... | 455/522 |
| 6,396,867 | B1 * | 5/2002 | Tiedemann et al. ......... | 375/141 |
| 6,442,155 | B1 * | 8/2002 | Suk et al. .................... | 370/342 |
| 2004/0028121 | A1 * | 2/2004 | Fitton ......................... | 375/144 |
| 2004/0166884 | A1 * | 8/2004 | Oh et al. ..................... | 455/522 |

FOREIGN PATENT DOCUMENTS

| | | | |
|---|---|---|---|
| EP | 0 936 751 | A2 | 8/1999 |
| EP | 0 991 204 | A2 | 4/2000 |
| JP | H09-312609 | A | 5/1996 |
| JP | 10-13339 | A | 1/1998 |
| JP | 2001-217773 | A | 8/2001 |
| JP | 2003-169018 | A | 11/2001 |
| JP | 2003-8507 | A | 1/2003 |
| JP | 2003-163630 | A | 6/2003 |

* cited by examiner

*Primary Examiner*—Edward Urban
*Assistant Examiner*—Fayyaz Alam
(74) *Attorney, Agent, or Firm*—Sughrue Mion, PLLC

(57) ABSTRACT

In a mobile phone of the present invention, de-spread circuits execute de-spread processing for receiving signals, and rake combines compose a plurality of information in the outputs of the de-spread circuits in correspondence to base stations, and calculate receiving levels of power control signals in individual channels in correspondence to the base stations to output the power control signals each having receiving level information to a comparator. The comparator outputs only the power control signal having the receiving level lying within a predetermined range from a maximum receiving level of the receiving levels of the power control signals from among the plurality of base stations to a decision circuit. The decision circuit decides based on the power control signal from the comparator whether a transmission power from the mobile phone should be increased or decreased to control the transmission power of a transmitter circuit, thereby preventing misrecognition of the power control signal.

5 Claims, 6 Drawing Sheets

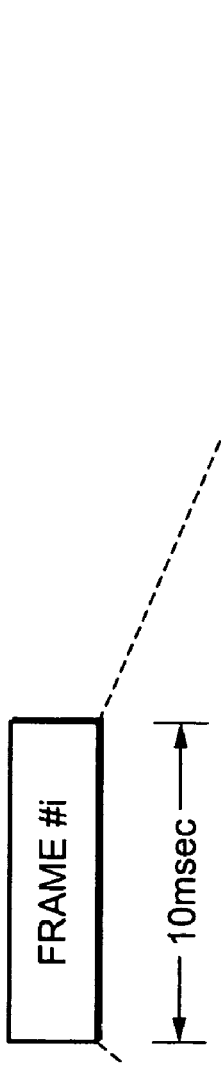
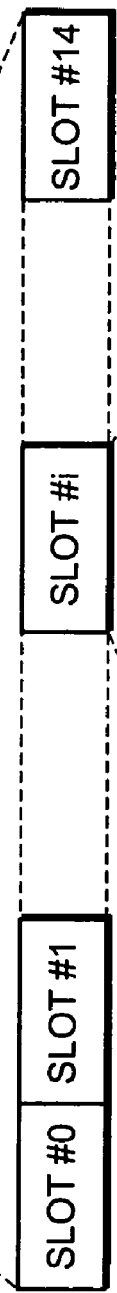
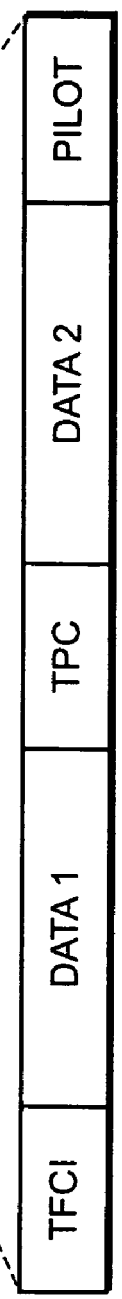
FIG. 1(a)
FIG. 1(b)
FIG. 1(c)

MOBILE PHONE AND METHOD OF CONTROLLING TRANSMISSION POWER

BACKGROUND OF THE INVENTION

1. Field of the Invention

The present invention relates in general to a mobile telephone system using a wideband-code division multiple access (W-CDMA) system or the like, and more particularly to a method of controlling a transmission power of a mobile phone.

2. Description of the Related Art

In a mobile telephone system using the W-CDMA system, the control for an transmission power is required in order to transmit data between a base station (when it is assumed that one base station is constituted by one sector) and a mobile phone at a minimum electric power.

As for a method including a power control, the base station calculates a receiving power from a power control signal contained in transmission data from each of the mobile phones individually connected to the base station, and decides based on the calculation results whether a power of a signal transmitted from the mobile phone should be increased or decreased. The decision results are issued to the mobile phone through a power control signal (TPC) contained in the transmission data from the base station.

A signal frame #i of a separate down physical channel transmitted from a base station to a mobile phone of a code division multiple access (CDMA) system, as shown in FIG. 1, is composed of fifteen slots #0 to #14. Each slot #i includes data of a transport format combination indicator (TFCI), Data 1, transmit power control (TPC), Data 2 and Pilot. The mobile phone is controlled in accordance with TPC bits sent from the base station to which the mobile phone is being connected so that its transmission power is either increased or decreased.

That is to say, the mobile phone judges a transmission power when data is transmitted next time by using the TPC bits sent from the base station as a power control signal. In this power controlling method, when the base station is connected in one-to-one correspondence to the mobile phone, it is judged based on only the power control signal from the base station whether the transmission power from the mobile phone should be increased or decreased.

However, a plurality of base stations may be connected to a mobile phone in some cases. In such cases, the power control signals are respectively transmitted from a plurality of base stations to the mobile phone. Then, the mobile phone judges based on the power control signals from a plurality of base stations whether a power of a transmission signal outputted next time should be increased or decreased. According to the specification of a 3rd generation partnership project (3GPP) of the W-CDMA, the regulation are made such that in a case where a mobile phone is connected to a plurality of base stations, a transmission power is increased only when a request to increase the transmission power is made from all the base stations, and a transmission power is decreased when a request to decrease the transmission power is made from at least one base station.

For example, when a mobile phone is connected to two base stations as shown in FIG. 2, no misdetection of a power control signal is caused because a communication environment provided among a mobile phone 12, and base stations 10 and 11 are held in a good state. In other words, since there is no obstacle between the base stations 10 and 11, and the mobile phone 12, a plurality of information of effective paths 13 is transmitted to the mobile phone 12 without propagation loss.

On the other hand, as shown in FIG. 3, when there are obstacles 14 such as buildings between a base station 11 and a mobile phone 12, a radio wave including an effective path 13 is reflected by the obstacles 14. For this reason, information of the effective path 13 of a remarkably low receiving level is used between the base station 11 and the mobile phone 12.

At this time, when both the base stations 10 and 11 make a request to increase a transmission power from the mobile phone 12, the mobile phone 12 must increase its transmission power. However, while the mobile phone 12 can recognize that the transmission power should be increased in accordance with a power control signal from the base station 10, the mobile phone 12 can not properly detect a power control signal from the base station 11; because the receiving state of the power control signal from the base station 11 is poor. For this reason, there is a possibility that the mobile phone 12 may recognize that it must decrease its transmission power by mistake. As a result, although both the base stations 10 and 11 make a request to increase the transmission power for the mobile phone 12, there is caused a situation in which the mobile phone 12 may carry out the control to decrease its transmission power. Consequently, there occurred deterioration of quality of the communication between the base stations 10 and 11, and the mobile phone 12, and disconnection of the communication.

In JP 2003-163630 A, such a problem is solved in a manner as will be described below. In regard to power control signals transmitted from all base stations and extracted by transmission power control information extracting means, when the power control signal from one base station instructs CDMA terminal equipment to decrease a power, and the power control signals from the remaining base stations instruct the CDMA terminal equipment to increase the power; the CDMA terminal equipment judges based on soft decision values of the power control signals from all the base stations whether its transmission power should be increased or decreased. Thus, there is avoided a problem that although all the base stations concerned in soft hand over (SHO) instruct a certain mobile phone to increase its transmission power, the transmission power is decreased due to a TPC bit error transmitted from one base station to deteriorate the communication quality of the mobile phone concerned.

However, in the technology described in JP 2003-163630 A, even the power control signal from the base station having a bad communication state is equally processed, which causes the CDMA terminal equipment to carry out misjudgment.

In addition, the soft decision processing is executed for deciding that the transmission power should be increased or decreased only when the power control signal from one base station among a plurality of base stations instructs the CDMA terminal equipment to decrease the power, and the power control signals from the remaining base stations instruct the CDMA terminal equipment to increase the power. As a result, when the power control signals from two or more base stations instruct the CDMA terminal equipment to decrease the transmission power, no soft decision processing is executed and thus, the transmission power is decreased.

Consequently, for example, in a state in which the CDMA terminal equipment is connected to three or more base stations, when the power control signal from the base station having the highest receiving level instructs the CDMA terminal equipment to increase the transmission power, but the CDMA terminal equipment recognizes that the power control signals from two or more base stations each having a lower receiving level instruct the CDMA terminal equipment to decrease the transmission power, the CDMA terminal equipment automatically decreases its transmission power. For this reason, there is also encountered a problem that the quality of the communication between the CDMA terminal equipment and the base station having the best communication state is deteriorated.

SUMMARY OF THE INVENTION

The object of the present invention is to solve the above-mentioned problems and provide a mobile phone which prevents the processing for decreasing a transmission power due to misrecognition of the power control signal and avoids deterioration of communication quality; the mobile phone evaluates power control signals from respective base stations which are worse in communication state by using a power control signal from a base station best in communication state as a reference.

In a transmission power controlling method for a mobile phone according to an embodiment of the present invention, a maximum level of a received signal is decided from among levels of received signals transmitted from the plurality of base stations as a reference, and judgment for transmission power control is carried out based on the power control signal lying within a range of a predetermined level from the maximum receiving signal level. The power control signal from the base station which is lower than the maximum receiving signal level not less than the predetermined level is excluded from an object of the judgment.

Further, in a transmission power controlling method for a mobile phone according to an embodiment of the present invention, rates of accordance between reference signals having known signal patterns transmitted from the plurality of base stations and a received reference signal are checked, and judgment for transmission power control is carried out based on the power control signal from the base station for which the rate of accordance is obtained at a level not less than a predetermined rate. The power control signal from the base station for which the rate of accordance between the received reference signal and the known signal pattern does not reach the predetermined rate is excluded from an object of the judgment.

In a transmission power controlling a mobile phone according to an embodiment of the present invention provides, (1) a plurality of de-spread circuits which execute de-spread processing for receiving signals allocated to a plurality of sets of effective paths through which signals from said plurality of base stations connected to the mobile phone through radio waves are received;

(2) a plurality of rake combines which collectively process output signals from the plurality of de-spread circuits in correspondence to the plurality of base stations, and add up receiving powers of the plurality of power control information obtained from said plurality of sets of effective paths in correspondence to the plurality of base stations to output the resultant signals in a form of power control signals each having receiving level information;

(3) a comparison circuit which detects a maximum receiving level value from receiving levels of the power control signals which are supplied thereto from said plurality of rake combines in correspondence to said plurality of base stations, and selects only the power control signal having the receiving level lying within a predetermined range from the maximum receiving level value to output the power control signal thus selected in a form of the power control information to a decision circuit;

(4) the decision circuit, based on the power control information supplied thereto from the comparison circuit, which decides whether the transmission power from said mobile phone should be increased or decreased; and (5) a transmitter circuit, based on decision results from the decision circuit, which carries out control so that the transmission power from the mobile phone is increased or decreased by a predetermined level.

Further, in a transmission power controlling a mobile phone according to an embodiment of the present invention provides, (1) a plurality of de-spread circuits which executes de-spread processing for receiving signals allocated to a plurality of sets of effective paths through which signals from the plurality of base stations connected to the mobile phone through radio waves are received;

(2) a plurality of rake combines which collectively process the output signals from the plurality of de-spread circuits in correspondence to the plurality of base stations, and output reference signals which are obtained by adding up power control signals and reference signals having known signal patterns, in which the power control signals are given by adding up the plurality of power control information obtained from the plurality of sets of effective paths, and the reference signals having known signal patterns are obtained from the plurality of sets of effective paths;

(3) a decision comparison circuit which compares the reference signals which are supplied from the plurality of rake combines in correspondence to the plurality of base stations with the known signal patterns and selecting only the power control signal from the base station from which the reference signal having a rate of accordance obtained at a level equal to or larger than a predetermined rate is received to output the power control signal thus selected in a form of the power control information;

(4) a decision circuit, based on the power control information inputted thereto from the decision comparison circuit, which decides whether the transmission power from the mobile phone should be increased or decreased; and a transmitter circuit, based on decision results from the decision circuit, which carries out control so that the transmission power from the mobile phone is increased or decreased by a predetermined level.

BRIEF DESCRIPTION OF THE DRAWINGS

These and other objects, features and advantages of the invention will become more fully apparent from the following detailed description taken in conjunction with accompanying drawings. In the drawings:

FIGS. 1(a) to 1(c) are diagrams showing a signal frame of a separate down physical channel of a CDMA communication system;

DETAILED DESCRIPTION OF THE EMBODIMENTS

Hereinafter, each embodiment of the present invention will be described in detail with reference to the drawings.

Figure 4:
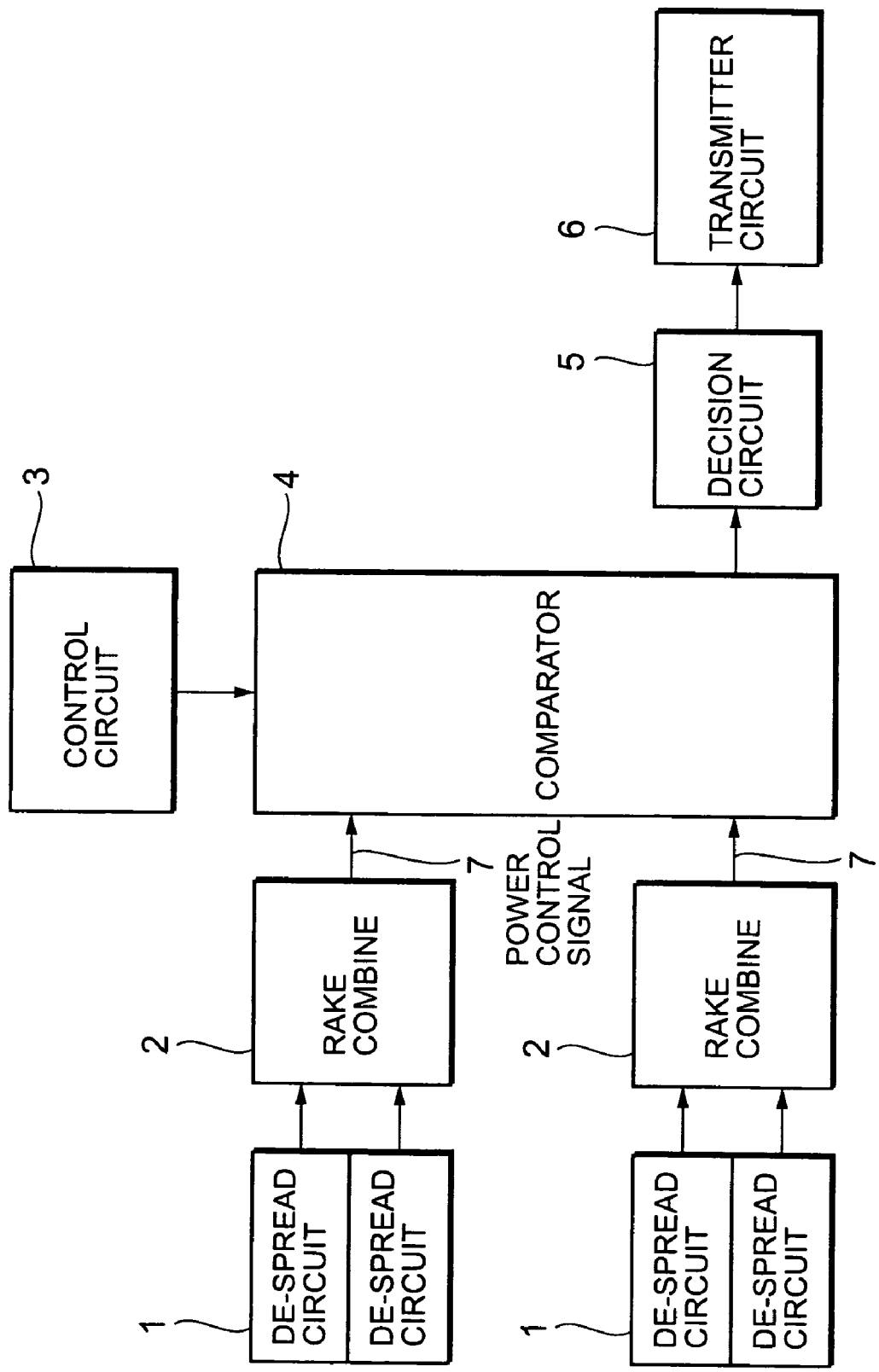
FIG. 4 is a block diagram showing a configuration of a mobile phone according to a first embodiment of the present invention.

FIG. 4 is a block diagram showing a configuration of a mobile, phone according to a first embodiment of the present invention. Note that in FIG. 4, blocks of constituent elements, which a mobile phone normally has, other than blocks of constituent elements directly related to the control for a transmission power of the present invention are not illustrated here because they are not directly related to the present invention.

In terms of a configuration related to the control for a transmission power, a mobile phone shown in FIG. 4 includes de-spread circuits 1, rake combines 2, a control circuit 3, a comparator 4, a decision circuit 5, and a transmitter circuit 6. Note that power control signals 7 from respective base stations, which are obtained through the composition processing in respective rake combines 2, are outputted to the comparator 4.

The same number of sets of de-spread circuits 1 and rake combines 2 are prepared as the number of base stations which can be simultaneously connected to the mobile phone concerned. In FIG. 4, two sets of de-spread circuits 1 and rake combines 2 are provided in correspondence to FIG. 2 so that the mobile phone can be simultaneously connected to the two base stations 10 and 11.

The de-spread circuit 1 executes the de-spread processing for receiving signals allocated to a plurality of effective paths (the two effective paths 13 in FIG. 2) in order to receive signals in the form of radio waves from the base station connected to the mobile phone. Since the two effective paths 13 are provided through which the mobile phone 12 receives the radio waves from each of the base stations 10 and 11 shown in FIG. 2, the two de-spread circuits 1 are prepared for the respective base stations. Note that the number of effective paths is not limited to two for one base station.

The rake combines 2 output the power control signals 7 in correspondence to the base stations, respectively; the power control signals 7 is the composite signals obtained by composing the received powers of the power control signals which are sent from a plurality of base stations through the individual channels. That is to say, the rake combines 2 collectively process the output signals from a plurality of de-spread circuits 1 in correspondence to the base stations; thereby add up the received powers of the power control signals 7 obtained from a plurality of sets of effective paths 13 to output the composite signals. Consequently, each power control signal 7 outputted to the comparator 4 contains the power control signal and information of a receiving level.

The comparator 4 searches for a value of the highest received power from a plurality of receiving level information contained in the power control signals 7 supplied from the respective rake combines 2 corresponding to the respective base stations. The comparator 4 compares the received powers (receiving levels) corresponding to the respective base stations with a reference value obtained by subtracting a predetermined decision threshold value inputted thereto from the control circuit 3 from the value of the highest received power thus searched. Then, the comparator 4 selects only the power control signal (first TPC) from the base station that has the received power larger than the reference value as an object of the decision; thus selected power control signal (first TPC) is sent to the decision circuit 5. The decision circuit 5 decides based on the power control signals selected by the comparison results from the comparator 4, whether the transmission electric power from the mobile phone 12 should be increased or decreased. The transmitter circuit 6 controls such that the transmission power from the mobile phone 12 is increased or decreased by the decision results from the decision circuit 5.

Figure 5:
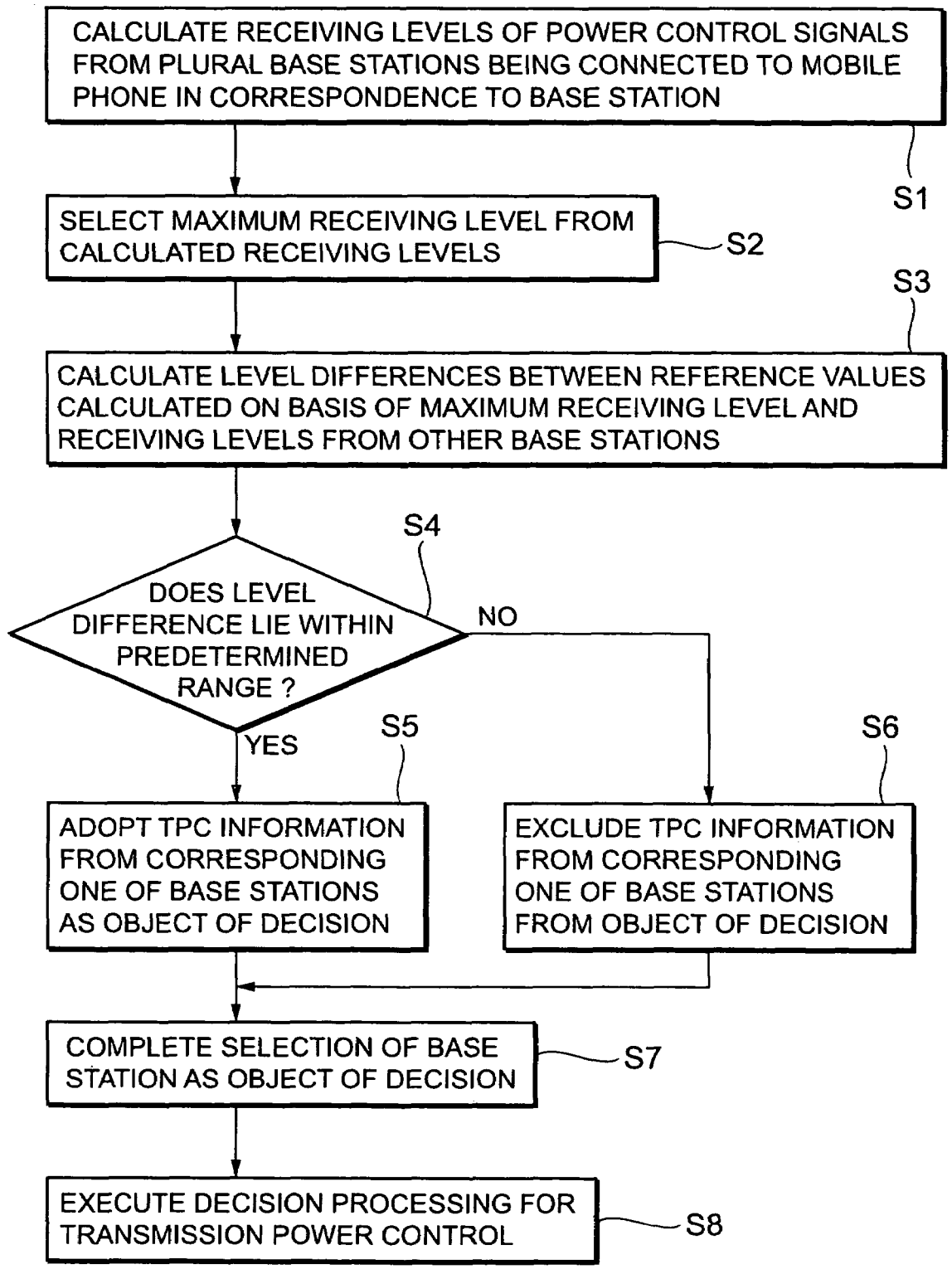
FIG. 5 is a flow chart for explaining an operation of the mobile phone according to the first embodiment of the present invention.

As described above, FIGS. 2 and 3 show the examples in each of which the mobile phone 12 of the present invention is connected to the two base stations 10 and 11 in order to carry out communication. FIG. 5 is a flow chart showing operations of the rake combines 2, the comparator 4 and the decision circuit 5 shown in FIG. 4. Hereinafter, an operation of the mobile phone 12 of the present invention will be described with reference to FIGS. 2 to 5.

Figure 2:
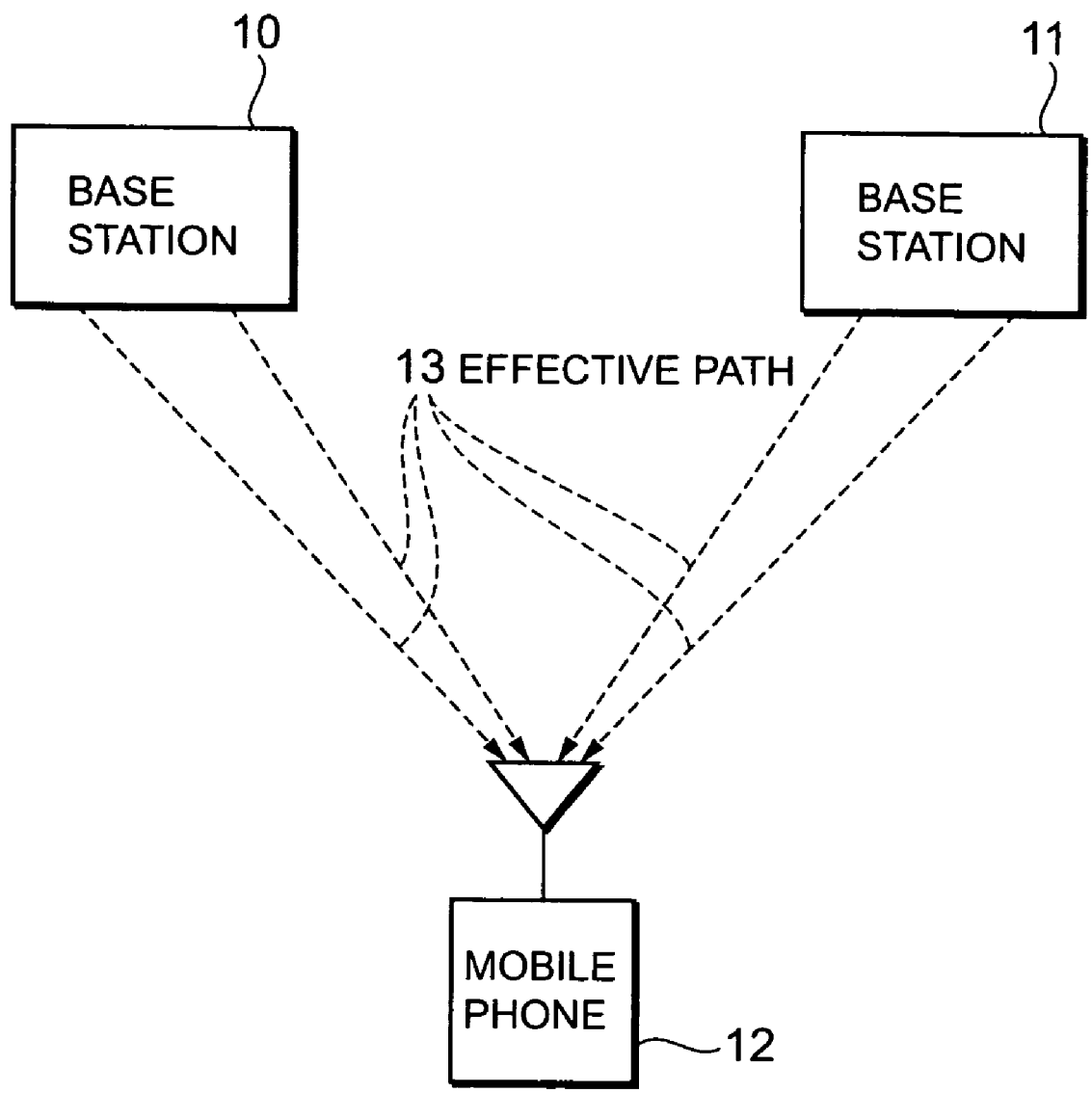
FIG. 2 is a diagram showing an example of transmission paths when a mobile phone of the present invention is connected to two base stations in order to carry out communication.

In order to receive only the signals of the individual channels of a plurality of base stations to which the mobile phone 12 is currently connected through the radio waves, the de-spread circuits 1 execute the de-spread processing for the receiving signals using codes (channelization codes and scramble codes) which are sent or detected from the base stations in advance. In the case of FIG. 2, since the two effective paths 13 are provided for each of the two base stations 10 and 11, the power control signals as the outputs of the de-spread circuits 1 from the same base stations are composed in the rake combines 2, respectively.

The rake combines 2, from the necessity of reflecting the power control for every slot, calculate the receiving levels of the power control signals inserted into the individual channels and obtained through a plurality of sets of effective paths from the base stations, and add up the receiving levels to output the resultant signals in the form of the power control signals 7 to the comparator 4, respectively (S1).

Then, the comparator 4 selects the power control signal 7 having the highest receiving level from among the power control signals 7 supplied thereto (S2). Then, the comparator 4 sets a reference value which is obtained by subtracting a predetermined decision threshold value inputted from the control circuit 3 from the maximum receiving level value. Then, the comparator 4 compares the receiving levels corresponding to the base stations with the reference value to thereby decide whether the receiving levels corresponding to the base stations are larger or smaller than the reference value (i.e., whether or not differences between the receiving levels corresponding to the base stations and the reference value fall within a predetermined range)(S3 and S4).

When it is decided in S4 that the receiving level is larger than the reference value (the level difference falls within the predetermined range), the power control signal (first TPC) received from the corresponding one of the base stations is adopted for decision of the control for the transmission power (S5). On the other hand, when it is decided in S4 that the receiving level is smaller than the reference value (the level difference is beyond the predetermined range), the power control signal (second TPC) received from the corresponding one of the base stations is excluded from an object of the decision of the control for the transmission power (S6).

After the selection related to whether or not the power control signal is decided as an object of the decision is completed with respect to the power control signals (first TPC) from all the base stations being connected to the mobile phone 12 (S7), the power control signals each selected as an object of the decision are outputted to the decision circuit 5.

The decision circuit 5 carries out the decision, based on the power control signals supplied thereto from the comparator 4, whether the transmission power from the mobile phone 12 should be increased or decreased, in accordance with the regulations of the 3rd generation partnership project (3GPP) specification (S8).

Figure 3:
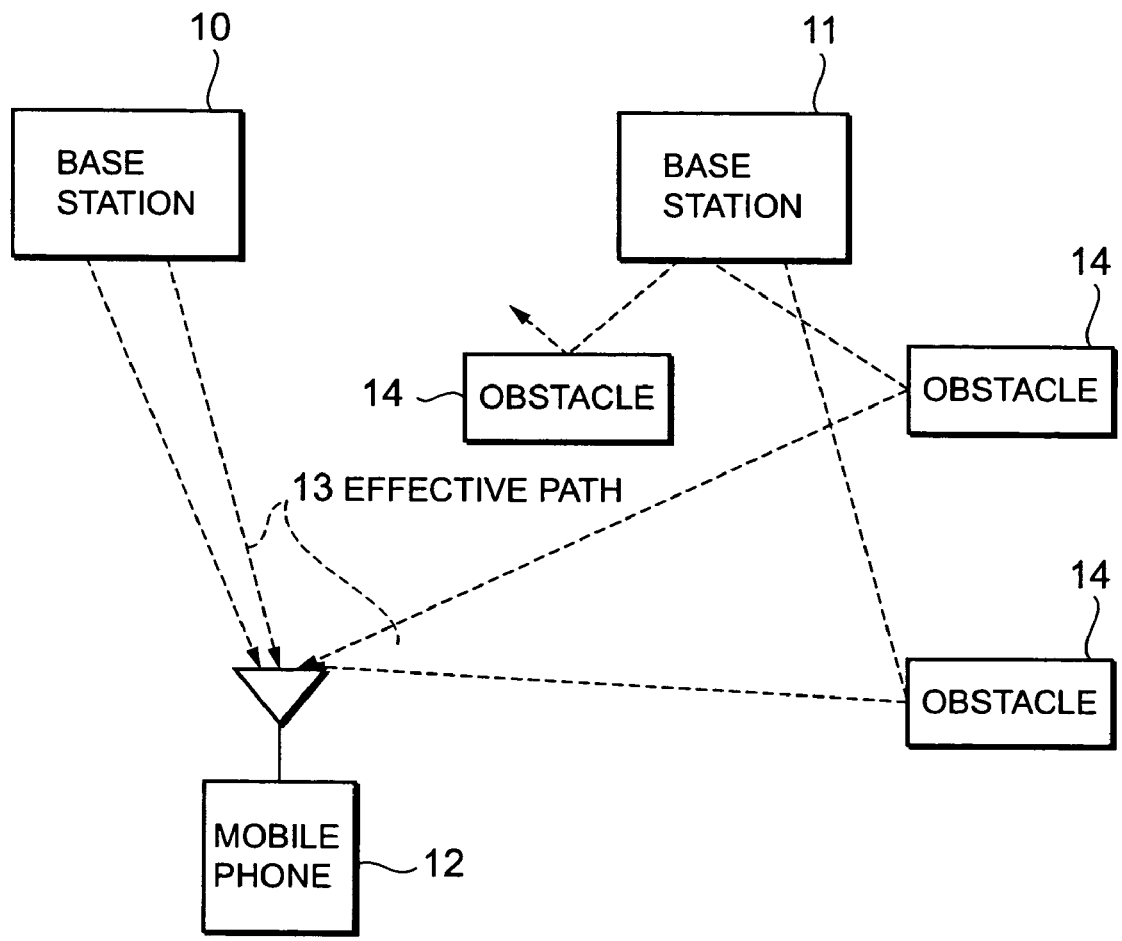
FIG. 3 is a diagram showing an example of transmission paths including obstacles when a mobile phone of the present invention is connected to two base stations in order to carry out communication.

Since in the case of the first embodiment shown in FIGS. 2 to 4, the number of base stations connected to the mobile phone 12 is two, the comparator 4 compares the receiving level obtained from a set of effective paths 13 of the base station 10 with the receiving level obtained from a set of effective paths 13 of the base station 11. The comparator 4 decides the higher receiving level as a reference, and also decides whether or not the lower receiving level is lower than the reference by a value (12 to 13 dB) specified from the control circuit 3. That is to say, the comparator 4 sets the higher receiving level as a maximum receiving level, and also sets a value which is obtained by subtracting the value (12 to 13 dB) specified from the control circuit 3 from the maximum receiving level as a reference value. Then, the comparator 4 compares the lower receiving level with the reference value.

Here, when it is decided that the lower receiving level is lower than the reference value, the power control signal received from the base station providing the lower receiving level is not sent to the decision circuit 5. On the other hand, when it is decided that the lower receiving level is higher than the reference value, i.e., when the lower receiving level lies within the value (12 to 13 dB) specified from the control circuit 3, the power control signals received from both the base stations 10 and 11 are sent to the decision circuit 5.

The decision circuit 5 decides based on the power control signals transmitted thereto from the comparator 4 whether the transmission power from the mobile phone 12 should be increased or decreased, and then sends the decision results to the transmitter circuit 6 to thereby decide the transmission power from the mobile phone 12.

In such a manner, it is judged based on the receiving states of the respective base stations, whether or not the power control signals from the respective base stations related to the soft hand over (SHO) should be reflected to the transmission output. Consequently, the control for the transmission power is prevented from being determined based on the TPC bits, i.e., the power control signal from the base station from which the bad receiving state is provided, and hence the communication quality is prevented from being deteriorated due to such a situation.

Figure 6:
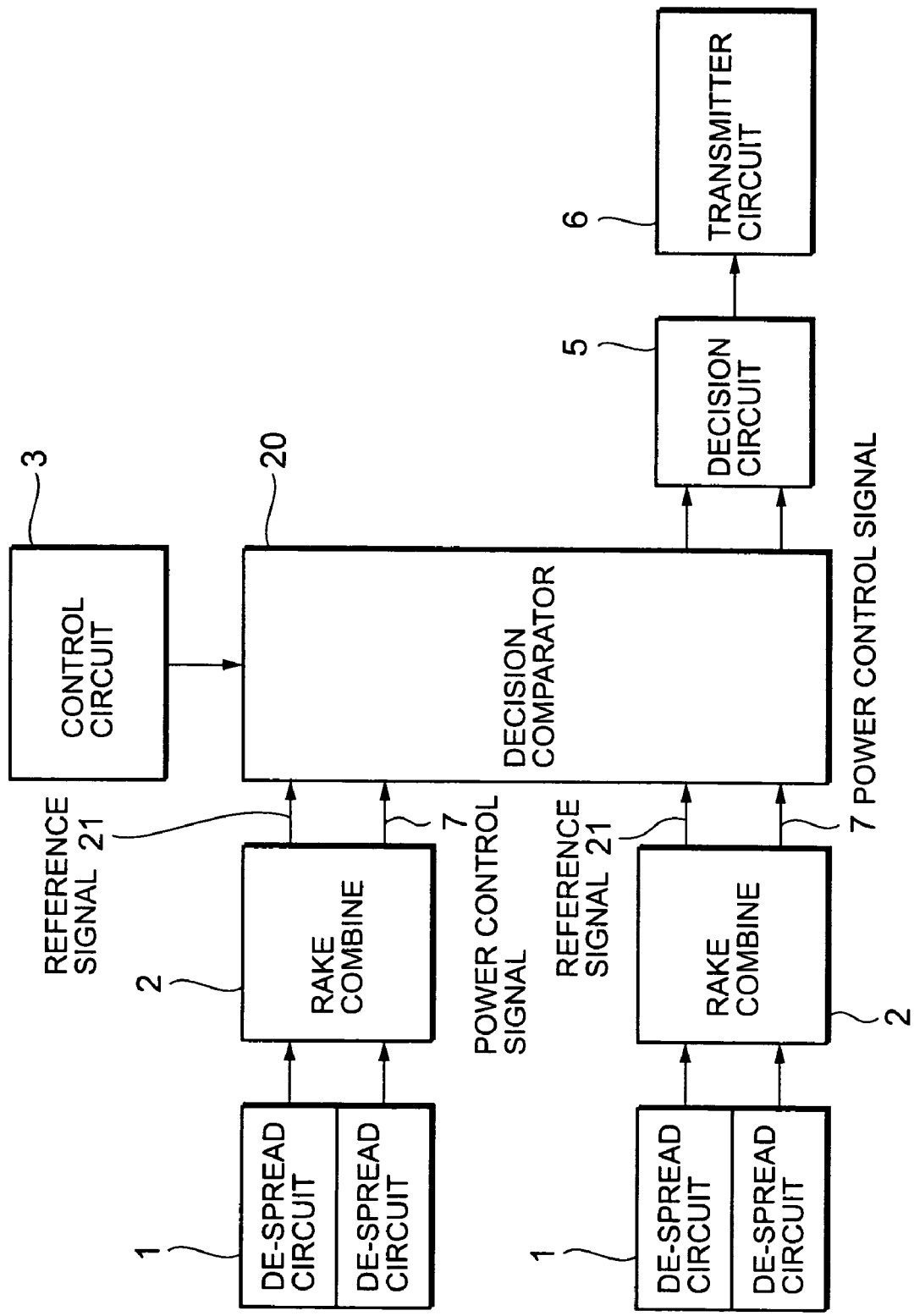
FIG. 6 is a block diagram showing a configuration of a mobile phone according to a second embodiment of the present invention.

FIG. 6 is a block diagram showing a configuration of a mobile phone according to a second embodiment of the present invention.

Note that in FIG. 6 as well, blocks of constituent elements which the mobile phone normally has other than the blocks of the constituent elements related to the control for the transmission power of the present invention are omitted here in its illustration.

In terms of a configuration, a mobile phone 12 according to the second embodiment of the present invention includes de-spread circuits 1, rake combines 2, a control circuit 3, a decision comparator 20, a decision circuit. 5, and a transmitter circuit 6. Note that each rake combine 2 outputs a power control signal 7 and a reference signal (Pilot signal) 21 to the decision comparator 20.

A point of difference in configuration between the mobile phones shown in FIGS. 4 and 6 is that in addition to execution of the composition processing in each rake combine 2 shown in FIG. 4, each rake combine 2 outputs a reference signal (Pilot signal) 21 contained in the power control signal transmitted from the corresponding one of the base stations to the decision comparator 20. In addition, for the purpose of deciding certainty of the power control signal, the mobile phone 12 of this embodiment includes the decision comparator 20 for deciding whether or not the reference signal (Pilot signal) 21 within the same slot as that of the power control signal is obtained at a value not less than the value specified by the control circuit 3.

Hereinafter, an operation of the mobile phone 12 of the second embodiment will be described with reference to FIG. 6.

In order to receive only the signals of individual channels of a plurality of base stations which are currently connected to the mobile phone 12 in a radio style, the de-spread circuits 1 execute the de-spread processing using codes (channelization codes and scramble codes) which are sent or detected from the respective base stations in advance. In the case of the mobile phone 12 as well shown in FIG. 6, there is supposed a case where the two effective paths 13 are provided for each of the two base stations 10 and 11. Moreover, a plurality of information sent from the same base stations as the outputs from the respective de-spread circuits 1 is composed in the respective rake combines 2.

The rake combines 2, from the necessity of reflecting the power control for every slot, add up the receiving levels of the reference signals and the power control signals, which are inserted into the individual channels and obtained from a plurality of sets of effective paths of the respective base stations; the resultant signals in the form of the reference signals 21 and the power control signals 7 are outputted to the decision comparator 20 in correspondence to the base stations.

The decision comparator 20 decides whether or not the reference signals 21, in the individual channels from the respective base stations, received from the respective rake combines 2 are received at a level not less than a value (a rate, e.g., 70%) specified from the control circuit 3, i.e., whether or not accordance rates are obtained at a level not less than a predetermined value for every base station. Then, the decision comparator 20 outputs only the power control signals thus obtained corresponding to the respective base stations in the form of the power control signals to the decision circuit 5 in the after stage. Since a pattern of the reference signal (Pilot signal) 21 is already known, the actually obtained results are compared with the essentially obtained signal pattern, whereby the reference signal 21 becomes a criteria when judging to what degree the signal from the base station can be accurately received.

The decision circuit 5 decides, based on the power control signals corresponding to the two base stations sent from the decision comparator 20, whether the transmission power from the mobile phone 12 should be increased or decreased. Then, the decision circuit 5 sends the decision results to the transmitter circuit 6 to thereby decide the transmission power from the mobile phone 12.

As set forth hereinabove, according to the present invention, the power control signal, having the highest receiving level of the power control signals received from a plurality of base stations is decided as the reference, and any of the power control signals from the base stations which do not reach a certain fixed receiving level is not used. Consequently, the control different from that to be carried out by the base station from which the best communication state is provided is prevented from being carried out due to the power control signal insufficient in receiving level. Hence, the enhancement of the communication quality, and the enhancement of the connection maintenance rate can be realized.

In addition, the misjudgment of the transmission power control signal from the base station can be prevented from being made. Hence, the communication can be usually carried out at the optimal power, and the wasteful power consumption can be suppressed.

It should be noted that the present invention is not intended to be limited to the above-mentioned configurations. For example, the comparator 4 and the decision comparator 20 may be software-controlled by the control circuit 3 without being configured in the form of the hardware.

What is claimed is:

1. A transmission power controlling method, for a mobile phone, of judging a plurality of power control information sent from a plurality of base stations to control based on judgment results so that a transmission power from said mobile phone is increased or decreased, the method comprising:

receiving a plurality of signals each with the power control information from the plurality of base stations;

deciding a maximum level as a reference, where the maximum level is decided based on a signal having a highest power level among the plurality of signals carrying out said transmission power control based on first power control information among said power control information, said first power control information transmitted from a first base station which transmits a first signal of level eliminating second power control information from an object of said transmission power control, said second power control information transmitted from a second base station which transmits a second signal of level wherein the first and second signal of level correspond to received power of said plurality of signals transmitted from said polarity of the base stations.

2. The transmission power controlling method for a mobile phone according to claim 1, wherein said receiving signal level is a value which, for each of the plurality of base station, is obtained by adding up received powers of the respective power control information obtained from respective effective paths of the corresponding one of said plurality of base stations.

3. A mobile phone having a function of judging a plurality of power control information sent from a plurality of base stations to control based on judgment results so that a transmission power from said mobile phone is increased or decreased, said mobile phone comprising:

a plurality of de-spread circuits which execute de-spread processing for receiving signals allocated to a plurality of sets of effective paths through which signals from said plurality of base stations connected to said mobile phone through radio waves are received;

a plurality of rake combines which collectively process output signals from said plurality of de-spread circuits in correspondence to said plurality of base stations, and add up receiving powers of the plurality of power control information obtained from said plurality of sets of effective paths in correspondence to said plurality of base stations to output the resultant signals in a form of power control signals each having receiving level information;

a comparison circuit which detects a maximum receiving level value from receiving levels of said power control signals which are supplied thereto from said plurality of rake combines in correspondence to said plurality of base stations, and selects only the power control signal having the receiving level lying within a range that is between the maximum receiving level value wherein the receiving level and a predetermined value to output said power control signal thus selected in a form of said power control information to a decision circuit;

said decision circuit, based on said power control information supplied thereto from said comparison circuit, which decides whether the transmission power from said mobile phone should be increased or decreased; and a transmitter circuit, based on decision results from said decision circuit, which carries out control so that the transmission power from said mobile phone is increased or decreased by a predetermined level, wherein the level of the receiving signal corresponds to a received power of said received signals transmitted from said plurality of base stations.

4. The method of claim 1, wherein the level of the received signal corresponds to a transmission power level of the received signal itself and the power control information is information transmitted in the received signal.

5. The mobile phone of claim 3, wherein the level of the received signal corresponds to a transmission power level of the received signal itself and the power control information is information transmitted in the received signal.

* * * * *